(12) United States Patent
Healy

(10) Patent No.: US 9,043,118 B2
(45) Date of Patent: May 26, 2015

(54) METHODS AND SYSTEMS FOR MODEL-BASED CONTROL OF GAS TURBINES

(75) Inventor: Timothy Andrew Healy, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1624 days.

(21) Appl. No.: 12/054,651

(22) Filed: Mar. 25, 2008

(65) Prior Publication Data

US 2008/0243352 A1 Oct. 2, 2008

Related U.S. Application Data

(60) Provisional application No. 60/909,606, filed on Apr. 2, 2007.

(51) Int. Cl.
*F02C 9/00* (2006.01)
*F01D 17/00* (2006.01)
*F02C 9/22* (2006.01)
*F02C 9/26* (2006.01)
*F02C 9/28* (2006.01)
*G05B 13/04* (2006.01)

(52) U.S. Cl.
CPC . *F02C 9/00* (2013.01); *F01D 17/00* (2013.01); *F02C 9/22* (2013.01); *F02C 9/26* (2013.01); *F02C 9/28* (2013.01); *F05D 2270/71* (2013.01); *G05B 13/041* (2013.01); *F05D 2270/44* (2013.01); *F05D 2270/31* (2013.01); *F05D 2270/54* (2013.01); *F05D 2270/3011* (2013.01); *F05D 2270/3013* (2013.01); *F05D 2270/303* (2013.01)

(58) Field of Classification Search
CPC ..... Y02T 10/47; Y02T 10/144; F02D 41/007; F02D 41/1401
USPC ................. 701/100, 103, 104, 109, 110, 114; 477/30; 123/321, 434, 568.21, 568.22
See application file for complete search history.

(56) References Cited

U.S. PATENT DOCUMENTS

| 3,902,315 | A | 9/1975 | Martin | |
|---|---|---|---|---|
| 2003/0144787 | A1* | 7/2003 | Davis et al. | ........ 701/100 |

(Continued)

FOREIGN PATENT DOCUMENTS

EP 1770331 4/2007

OTHER PUBLICATIONS

International Search Report for PCT/US2008/058434 dated Mar. 27, 2008 (3 pages).

*Primary Examiner* — Redhwan K Mawari
*Assistant Examiner* — Rodney P King
(74) *Attorney, Agent, or Firm* — Sutherland Asbill & Brennan LLP

(57) ABSTRACT

Embodiments of systems and methods for tuning a turbine are provided. In one embodiment, a method may include receiving at least one of a measured operating parameter or a modeled operating parameter of a turbine during operation; and tuning the turbine during operation. The turbine may be tuned during operation by applying the measured operating parameter or modeled operating parameter or parameters to at least one operational boundary model, applying the measured operating parameter or modeled operating parameter or parameters to at least one scheduling algorithm, comparing the output of the operational boundary model or models to the output of the scheduling algorithm or algorithms to determine at least one error term, and closing loop on the one error term or terms by adjusting at least one turbine control effector during operation of the turbine.

20 Claims, 4 Drawing Sheets

(56) References Cited

U.S. PATENT DOCUMENTS

| | | | |
|---|---|---|---|
| 2003/0144788 A1* | 7/2003 | Brackney et al. | 701/103 |
| 2004/0255595 A1 | 12/2004 | Morgan | |
| 2005/0107941 A1* | 5/2005 | Healy | 701/100 |
| 2007/0073525 A1 | 3/2007 | Healy | |

* cited by examiner

METHODS AND SYSTEMS FOR MODEL-BASED CONTROL OF GAS TURBINES

CROSS-REFERENCE TO RELATED APPLICATIONS

The present application claims priority to U.S. Provisional Application No. 60/909,606 entitled "Methods and Systems for Model-based Control of Gas Turbines" filed on Apr. 2, 2007, which is incorporated herein by reference in its entirety.

TECHNICAL FIELD

The invention relates generally to gas turbine control systems, and more particularly relates to providing methods and systems for model-based control of gas turbines.

BACKGROUND OF THE INVENTION

Industrial and power generation gas turbines have control systems that monitor and control their operation. These control systems may be designed to meet the power and efficiency objectives while governing operational aspects of the gas turbine.

Current control systems may execute scheduling algorithms that adjust the fuel flow, inlet guide vanes (IGV), and other control inputs to provide safe and efficient operation of the gas turbine. Gas turbine control systems typically receive as inputs operating parameters and settings that, in conjunction with scheduling algorithms, determine turbine control settings to achieve the desired operation. Measured operating parameters may include, but are not limited to, compressor inlet pressure and temperature, compressor exit pressure and temperature, turbine exhaust temperature, and generator power output. Desired operating settings may include, but are not limited to, generator power output and exhaust energy. The schedules (e.g., exhaust temperature vs. compressor pressure ratio, fuel splits vs. combustion reference temperature, inlet bleed heat vs. ICV, compressor operating limit line vs. corrected speed and inlet guide vane, etc.) are typically defined to protect the turbine against known operational boundaries (e.g., emissions, dynamics, lean-blow-out, compressor surge, compressor icing, compressor clearances, aero-mechanical, etc.) based on off-line field tests or laboratory data. The output of the schedules then determines the appropriate adjustment of the control system inputs. Typical control inputs (also referred to as "effectors") managed by a control system may include, but are not limited to, fuel flow, combustor fuel distribution (which may be referred to as "fuel splits"), compressor inlet guide vane, and inlet bleed heat flow.

However, forcing strict turbine compliance with schedule-based control systems can cause performance to be sacrificed at many operating conditions in an effort to protect against worst-case operational boundaries. Additionally, rigid schedule-based control systems may not provide a relatively simple means for identifying and incorporating component deterioration while controlling the operation of the gas turbine. For example, as the machine is operated the components may foul or degrade, which may in turn alter the characteristics of one or more of the operational boundaries. Without identifying the deterioration as it occurs, the system will either have to be re-tuned periodically, have boundaries set artificially low (or high as some boundaries might require) to preemptively accommodate component deterioration, or risk violating operational boundaries that may lead to excessive fatigue or failure. Similarly, schedule-based control systems may also not be able to effectively accommodate changing conditions (e.g., gas quality, ambient conditions, or other un-modeled disturbances) to either tune for the most efficient operation or to avoid violation of component operational limits. Another disadvantage to schedule-based control systems is the resultant coupling that may occur between different turbine control effectors which creates inflexible tuning and may prohibit operating turbines at their optimized levels. For example, fuel splits depend on the firing temperature, which is in turn proportional to the exhaust temperature, which is often scheduled with compressor pressure ratio. In this scenario, a change to the exhaust temperature schedule may necessarily require changing the fuel split schedule.

Thus, there exists a need for methods and systems for model-based control systems of gas turbines.

BRIEF DESCRIPTION OF THE INVENTION

Embodiments of the invention can address some or all of the needs described above. Embodiments of the invention are directed generally to systems and methods for model-based control of gas turbines.

According to one example embodiment a method for controlling turbines is provided. The method may include receiving at least one turbine operating parameter; applying the at least one turbine operating parameter to at least one operational boundary model to determine at least one estimated boundary level; applying the turbine operating parameter or parameters to at least one scheduling logic algorithm to determine at least one boundary target; comparing the estimated boundary level or levels with the boundary target or targets to determine at least one error term; and adjusting at least one turbine control effector to reduce the error term or terms.

According to another example embodiment, a turbine control system is provided. This turbine control system may include at least one turbine control effector, at least one turbine operating sensor, a controller, and a communications interface. Further, the controller may be in communication with the control effector or effectors and the operating turbine sensor or sensors via the communications interface. The controller may be operable to receive at least one of a measured turbine operating parameter measured by the at least one turbine sensor or a modeled operating parameter modeled by the controller, store at least one operational boundary model, store at least one scheduling logic algorithm, apply the turbine operating parameter or parameters to the operational boundary model or models to determine at least one estimated boundary level, apply the turbine operating parameter or parameters to the scheduling logic algorithm or algorithms to determine at least one boundary target, compare the estimated boundary level or levels with the boundary target or targets to determine at least one error term, and adjust the turbine control effector or effectors to reduce the error term or terms.

According to yet another example embodiment, a method for tuning a turbine is provided. The method may include receiving at least one of a measured operating parameter or a modeled operating parameter of a turbine during operation; and tuning the turbine during operation. The turbine may be tuned during operation by applying the measured operating parameter or modeled operating parameter or parameters to at least one operational boundary model, applying the measured operating parameter or modeled operating parameter or parameters to at least one scheduling algorithm, comparing the output of the operational boundary model or models to the output of the scheduling algorithm or algorithms to determine at least one error term, and closing loop on the one error term or terms by adjusting at least one turbine control effector during operation of the turbine.

Other embodiments and aspects of the invention will become apparent from the following description taken in conjunction with the following drawings.

BRIEF DESCRIPTION OF THE DRAWINGS

Figure 1:
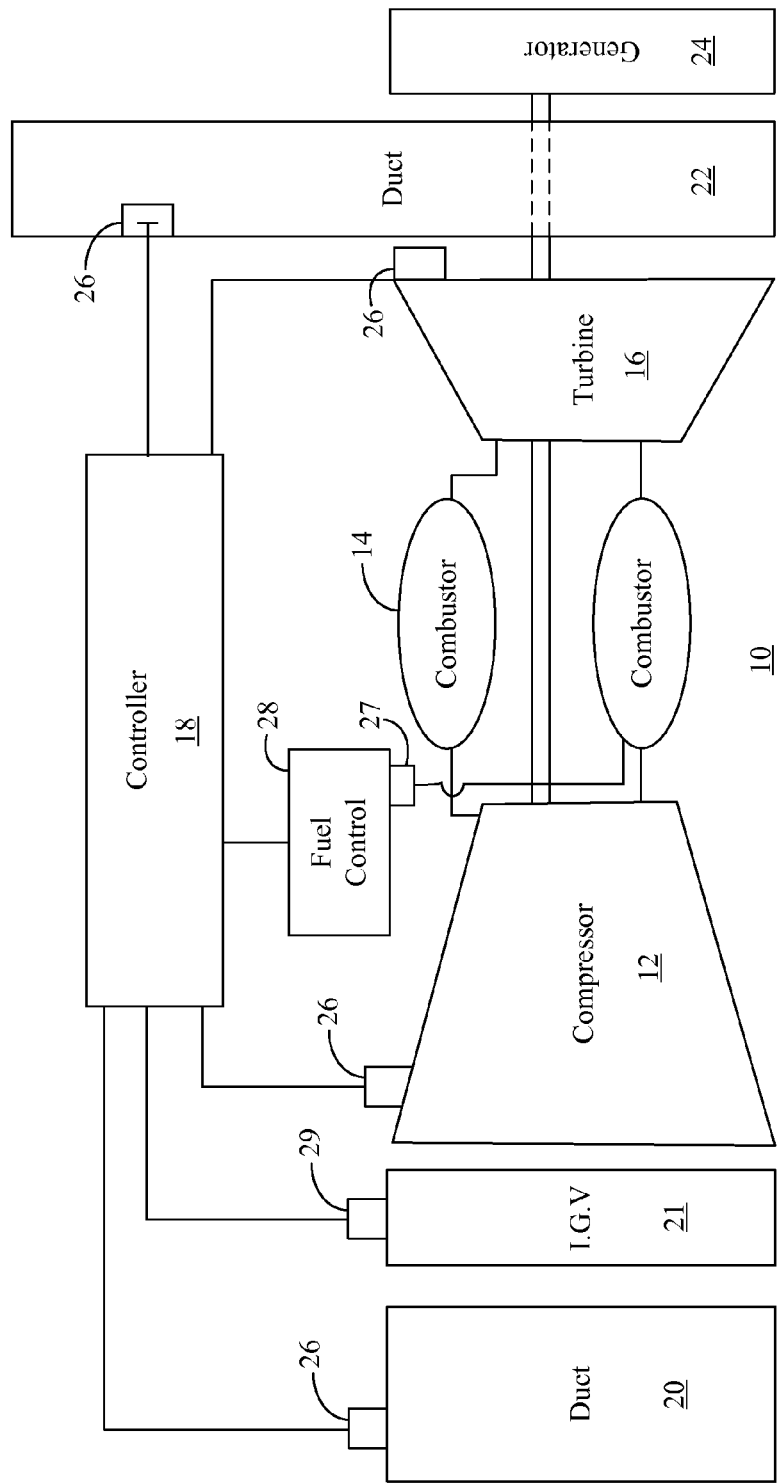
Figure 2:
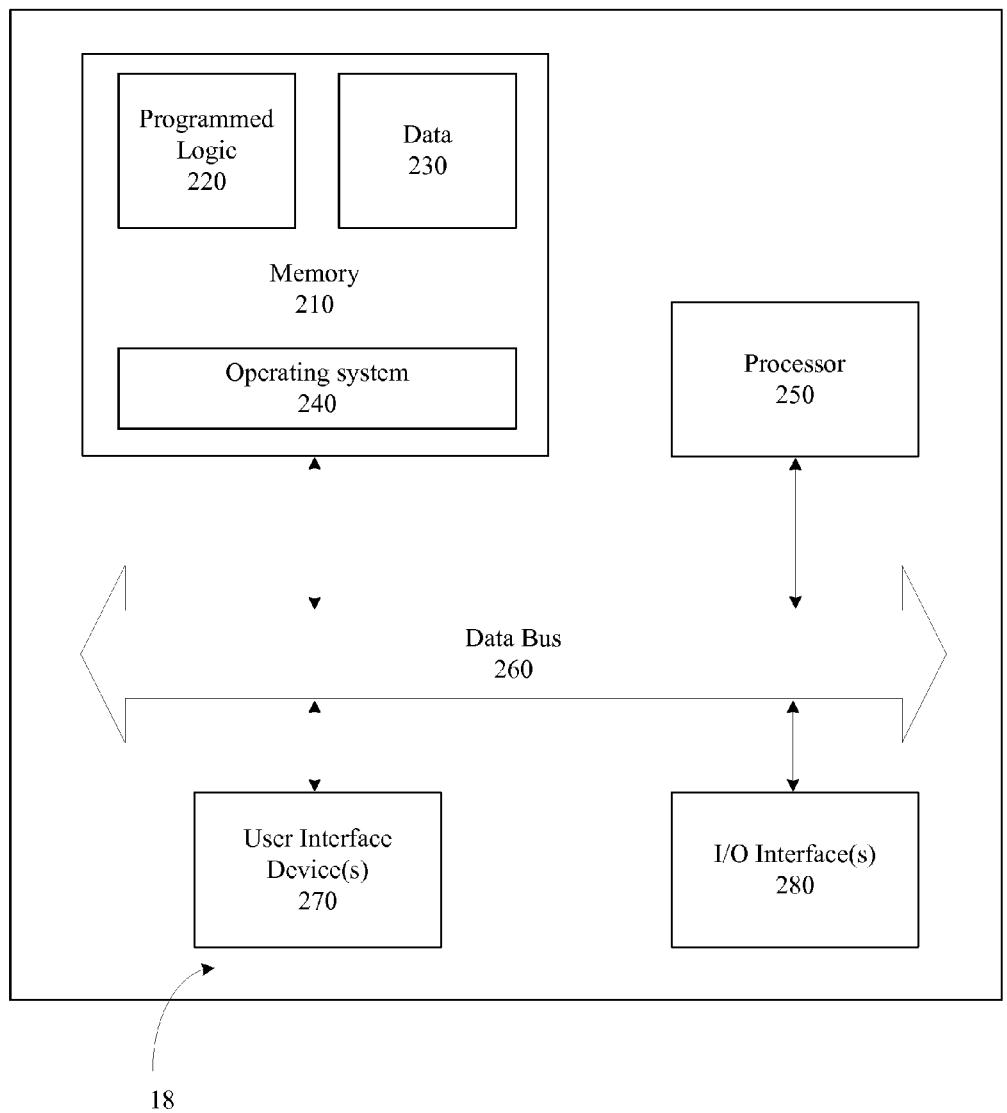
Figure 3:
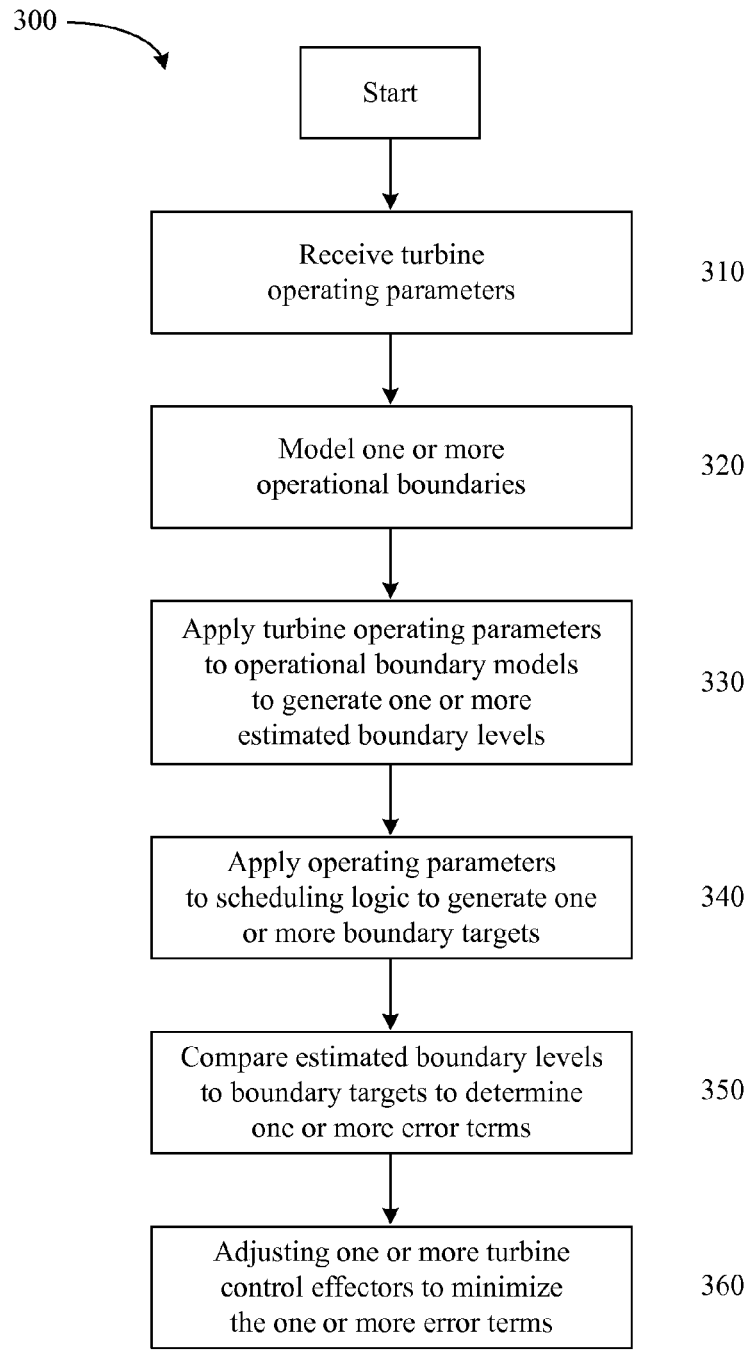
Figure 4:
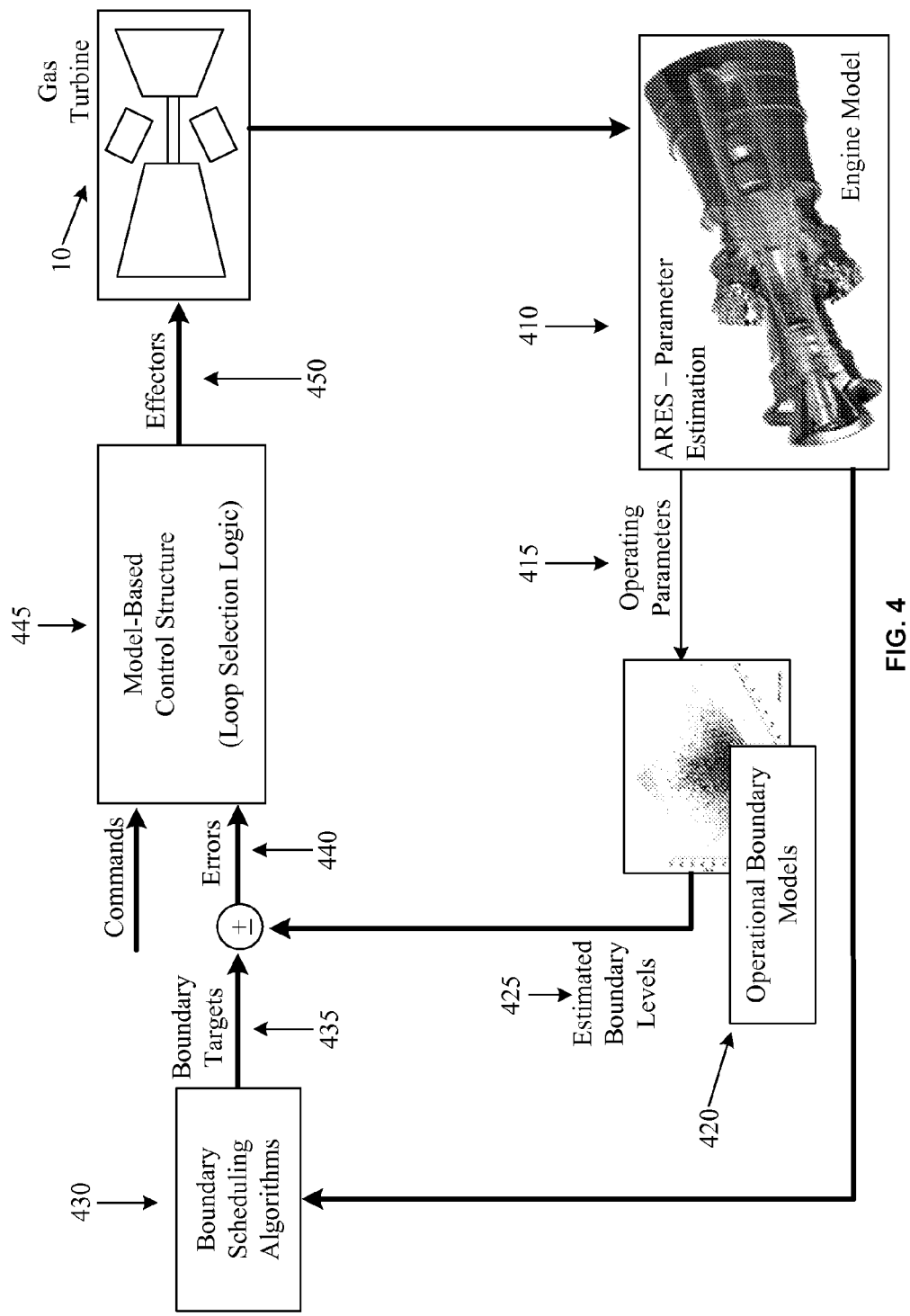

Having thus described embodiments of the invention in general terms, reference will now be made to the accompanying drawings, which are not necessarily drawn to scale, and wherein:

FIG. 1 illustrates an example functional block diagram depiction of a gas turbine having a control system according one embodiment of the invention;

FIG. 2 illustrates an example functional block diagram of an example controller according to one embodiment of the invention;

FIG. 3 illustrates an example flowchart of a method for implementing model-based control of a gas turbine according to one embodiment of the invention; and FIG. 4 illustrates an example functional block diagram illustrating model-based control of a gas turbine according to one embodiment of the invention.

DETAILED DESCRIPTION OF THE INVENTION

The invention now will be described more fully hereinafter with reference to the accompanying drawings, in which example embodiments of the invention are shown. This invention may, however, be embodied in many different forms and should not be construed as limited to the example embodiments set forth herein; rather, these embodiments are provided so that this disclosure will satisfy applicable legal requirements. Like numbers refer to like elements throughout.

Embodiments of the invention can provide a model-based control system that allows for controlling a gas turbine. The model-based control systems described in detail herein allow for improved performance and operational flexibility. Performance and operational flexibility may be achieved, at least in part, through the use of systems and methods that incorporate models of gas turbine operational boundaries in an online control system that may be operated in real-time or in near-real-time. More specifically, certain embodiments of the invention provide systems and methods that receive operating parameters indicating the turbine's present operating state, define operational boundaries by way of physics-based models or transfer functions, apply the operating parameters to the operational boundary models, apply the operating parameters to scheduling algorithms, determine error terms, and control boundaries by adjusting one or more turbine control effectors to close loop on the boundary transfer functions and minimize the error terms real-time.

Example embodiments of the invention can perform or otherwise facilitate certain technical effects including, but not limited to, controlling turbine operational boundaries by way of applying turbine operating parameters to operational boundary models and scheduling algorithms, and minimizing the error term therebetween by adjusting turbine control effectors. Controlling turbine operation by way of these model-based control systems may have the technical effect of allowing for operating the turbine at greater efficiencies and improved power generation levels. Additionally, example embodiments of the invention may have the technical effect of allowing for more accurate control of the turbine running at or near desired levels in real-time or near-real-time.

FIG. 1 depicts an example gas turbine 10 having a compressor 12, a combustor 14, turbine 16 drivingly coupled to the compressor, and a computer control system (controller) 18. An inlet duct 20 to the compressor 12 feeds ambient air and, in some instances, injected water to the compressor 12. The inlet duct 20 may have ducts, filters, screens and sound absorbing devices that contribute to a pressure loss of ambient air flowing through the inlet duct 20 and into inlet guide vanes 21 of the compressor 12. An exhaust duct 22 for the turbine directs combustion gases from the outlet of the turbine 10 through, for example, emission control and sound absorbing devices. The exhaust duct 22 may include sound adsorbing materials and emission control devices that apply a backpressure to the turbine 10. The amount of inlet pressure loss and back pressure may vary over time due to the addition of components to the ducts 20, 22, and to dust and dirt clogging the inlet and exhaust ducts. The turbine 10 may drive a generator 24 that produces electrical power. The inlet loss to the compressor 12 and the turbine exhaust pressure loss tend to be a function of corrected flow through the gas turbine 10.

The operation of the gas turbine 10 may be monitored by several sensors 26 detecting various observable conditions of the turbine 10, the generator and the ambient environment. In many instances, multiple redundant sensors may measure the same measured condition. For example, groups of redundant temperature sensors 26 may monitor ambient temperature surrounding the gas turbine 10, compressor discharge temperature, turbine exhaust gas temperature, and other temperature measurements of the gas stream through the gas turbine 10. Similarly, groups of redundant pressure sensors 26 may monitor ambient pressure, and static and dynamic pressure levels at the compressor inlet and outlet, turbine exhaust, at other locations in the gas stream through the gas turbine 10. Groups of redundant humidity sensors 26, for example, wet and dry bulb thermometers, may measure ambient humidity in the inlet duct of the compressor 12. Groups of redundant sensors 26 may also include flow sensors, speed sensors, flame detector sensors, valve position sensors, guide vane angle sensors, or the like, that sense various parameters pertinent to the operation of gas turbine 10. As used herein, "parameters" refer to items that can be used to define the operating conditions of the turbine, such as temperatures, pressures, and gas flows at defined locations in the turbine.

A fuel control system 28 regulates the fuel flowing from a fuel supply to the combustor 14, one or more splits between the fuel flowing into primary and secondary fuel nozzles, and the amount of fuel mixed with secondary air flowing into a combustion chamber. The fuel control system 28 may also select the type of fuel for the combustor. The fuel control system 28 may be a separate unit or may be a component of the main controller 18.

The controller 18 may be a computer system having at least one processor that executes programs and operations to control the operation of the gas turbine using sensor inputs and instructions from human operators. The programs and operations executed by the controller 18 may include, among others, sensing or modeling operating parameters, modeling operational boundaries, applying operational boundary models, applying scheduling algorithms, and applying boundary control logic to close loop on boundaries. The commands generated by the controller 18 may cause actuators on the gas turbine to, for example, adjust valves (actuator 27) between the fuel supply and combustors that regulate the flow, fuel splits and type of fuel flowing to the combustors; adjust inlet guide vanes 21 (actuator 29) on the compressor; adjust inlet bleed heat; as well as activate other control settings on the gas turbine.

Operating parameters indicate the operating conditions of the turbine, such as temperatures, pressures, and gas flows, at defined locations in the turbine and at given operating states. Some operating parameters are measured (i.e., are sensed and are directly known). Other operating parameters are estimated by a model and are indirectly known. Operating parameters that are modeled may also be referred to as surrogate operating parameters. Operational boundary models may represent in the physical space of the turbine one or more operational boundaries, indicating optimal performance of the gas turbine at each of the boundaries. Further, operational boundary models may be independent of any other boundaries or operating conditions. Scheduling algorithms determine settings for the turbine control effectors to cause the turbine to operate within predetermined limits. Typically, scheduling algorithms protect against worst-case scenarios and have built-in assumptions based on certain operating states. Boundary control is the process by which the controller is able to adjust turbine control effectors to cause the turbine to operate in a preferred state. Boundary control may also be referred to as "closing loop" on boundaries because it attempts to minimize the deviation from one or more of the estimated boundary levels and/or boundary targets.

FIG. 2 illustrates by way of a block diagram the controller 18 used to implement the model-based control system, according to an illustrative embodiment of the invention. More specifically, the elements of the computerized controller 18 may be used to execute the operational parameter modeling, boundary transfer function analysis, scheduling logic application, and boundary control logic. The computerized controller 18 may include a memory 210 that stores programmed logic 220 (e.g., software) and may store data 230, such as sensed operating parameters, surrogate operating parameters, estimated boundary levels, scheduling logic, and boundary targets. The memory 210 also may include an operating system 240. A processor 250 may utilize the operating system 240 to execute the programmed logic 220, and in doing so, also may utilize the data 230. A data bus 260 may provide communication between the memory 210 and the processor 250. Users may interface with the controller 18 via at least one user interface device 270 such as a keyboard, mouse, control panel, or any other devices capable of communicating data to and from the controller 18. The controller 18 may be in communication with the gas turbine online while operating, as well as in communication with the gas turbine offline while not operating, via an I/O Interface 280. More specifically, one or more of the controllers 18 may carry out the execution of the model-based control system, such as, but not limited to, sense and/or model operating parameters, apply operating parameters to modeled operational boundaries, determine error terms, and close loop on the operational boundaries by adjusting one or more turbine control effectors. Additionally, it should be appreciated that other external devices or multiple other gas turbines may be in communication with the controller 18 via the I/O Interface 280. In the illustrated embodiment, the controller 18 may be located remotely with respect to the gas turbine; although, it may be co-located or even integrated with the gas turbine. Further the controller 18 and the programmed logic 220 implemented thereby may include software, hardware, firmware, or any combination thereof. It should also be appreciated that multiple controllers 18 may be used, whereby different features described herein may be executed on one or more different controllers 18.

FIG. 3 illustrates an example method by which an embodiment of the invention may operate. Provided is an example flowchart 300 of the basic operation of model-based control system, executed by the controller, used to apply operational boundary models in real time and to close loop on those boundary levels during operation, according to an illustrative embodiment of the invention.

At block 310, the controller may receive one or more operating parameters indicating the operating states of the turbine. As discussed, operating parameters may be measured, modeled, or a combination thereof. Measured operating parameters may include, but are not limited to, ambient conditions, angle of the inlet guide vanes, amount of fuel flow, turbine rotational speed, compressor inlet pressure and temperature, compressor exit pressure and temperature, turbine exhaust temperature, and generator power output. Modeled operating parameters may include, but are not limited to, compressor airflow, combustor fuel/air ratio, firing temperature (turbine inlet), combustor flame temperature, fuel system pressure ratios, and acoustic characteristics. Further, one or more of the measured parameters may also be modeled to increase accuracy and to create system redundancies. Modeled operating parameters may also be referred to as surrogate operating parameters. The surrogate and/or measured operating parameters may act as inputs to operational boundary models and scheduling logic algorithms as described below in reference to blocks 330 and 340.

It is appreciated that the methods and systems disclosed herein do not directly depend on whether the operating parameters are measured or modeled. However, for example purposes, a general discussion of the methods and systems that may be used to model operating parameters is given. The controller may include, for example, a generated model of the gas turbine. The model may be an arrangement of one or more mathematical representations of the operating parameters. Each of these representations may rely on input values to generate an estimated value of a modeled operating parameter. The mathematical representations may generate a surrogate operating parameter value that may be used in circumstances where a measured parameter value is not available. The model may be a physics-based aero-thermodynamic computer model, a regression-fit model, neural-net model, or any other suitable computer model of a gas turbine. The model may be utilized to generate surrogate operating parameters as input to the operational boundary models and scheduling logic algorithms.

Following block 310 is block 320, in which the controller may include one or more operational boundary models. The operational boundary models represent operational boundaries at or near which it is desirable for the turbine to operate in order to achieve operational efficiencies and desired performance. Models may be, for example, physics-based boundary models or transfer functions that mathematically model the individual characteristics of a given operational boundary in the physical space in which the turbine exists. The operational boundary models may be determined using one or both of a historic approach, based on historic and bench test-type data, or a lumped-parameter approach, based on a combined physics and empirical approach. The models may require as inputs operating parameters, like those directly measured from the turbine, or surrogate operating parameters, as described above in reference to block 310. Typical gas turbine operational boundaries include, but are not limited to, hot gas path durability (or firing temperature), exhaust frame durability, NOx emissions, CO emissions, combustor lean blow-out, combustion dynamics, compressor surge, compressor icing, compressor aero-mechanical limits, compressor clearances, and compressor discharge temperature. Defining individual boundary avoids or reduces the coupling effect that may occur using only schedule-based control systems, such as having many schedules expressly or implicitly tied to exhaust temperature, for example.

Block 330 follows block 320, where the one or more operating parameters act as inputs to the operational boundary models determined at block 320. The operational boundary models may be analyzed in real-time, or near-real-time, while the turbine is online, in consideration of real-time operating parameters. The operating parameters acting as inputs to the operational boundary models may be measured operating parameters or surrogate operating parameters as described in reference to block 310 above. Accordingly, each model operational boundary analyzed produces an estimated boundary level corresponding to the turbine operation relative to the boundary model.

Following block 330 is block 340, in which the one or more operating parameters also act as inputs to scheduling logic algorithms. The scheduling algorithms may be used to force the turbine to operate within certain limits, usually to avoid worst-case scenarios. For example, scheduling algorithms may be used to maintain the NOx and CO emissions in the turbine exhaust within certain predefined emission limits, and to maintain the combustor firing temperature within predefined temperature limits. The scheduling algorithms may have inputs for boundary parameter variables such as, but not limited to, current compressor pressure ratio, compressor discharge temperature, exhaust temperature, combustion reference temperature, and inlet guide vane settings. Scheduling algorithms may be tied to turbine control effectors such as, but not limited to, total fuel flow, inlet guide vane settings, inlet bleed heat settings, and one or more fuel split settings. The scheduling algorithms may generate boundary targets for setting the control effectors based on the inputs.

Block 350 follows block 340, in which the one or more estimated boundary levels from the operational boundary models may be compared to boundary targets set by the predetermined boundary scheduling algorithms. The estimated boundary levels determined at block 330 are compared to the scheduling algorithm boundary targets to determine an error term for each estimated boundary level. The error terms indicate the difference between the estimated boundary levels and the boundary targets to determine the appropriate adjustment of one or more turbine control effectors.

Following block 350 is block 360, where the controller may then close loop on one or more of the boundaries to minimize the error term or terms determined at block 350 so as to cause the turbine to operate close to the modeled boundaries, for example, as close to the modeled boundaries as possible. More specifically, at block 360 the controller closes loop by first determining the relationships between the modeled operational boundaries and the turbine control effectors. Example turbine control effectors are, but not limited to, total fuel flow, inlet guide vane settings, inlet bleed heat settings, and one or more fuel split settings. One or more operational boundaries may relate to a single turbine control effector. For each turbine control effector, the controller will then determine which operational boundary imposes the greatest operating limitation and then adjust the effector to minimize deviation from that boundary. This process of adjusting the turbine control effector effectively closes loop for the one or more boundary conditions affected. Because this process is performed for each effector in real-time, and because the operational boundaries as modeled do not depend upon other effector settings explicitly or implicitly, the turbine can be adjusted to optimize operation within one or more operational boundaries without being constrained by other operating boundary settings.

FIG. 4 provides another example model-based control as executed by the controller and described in detail in reference to FIG. 3 above. In FIG. 4, a controller which may execute model 410 is in communication with the gas turbine 10. The model 410 measures and/or models the operating parameters of the turbine 10 and communicates the parameters to multiple operational boundary models 420 by way of measured and/or surrogate operating parameters 415. The measured and/or surrogate operating parameters 415 are applied to the operational boundary models to produce estimated boundary levels 425. The controller also includes boundary scheduling algorithms 430 which produces boundary targets 435 based on measured and surrogate operating parameters. The boundary targets and the estimated boundary levels are compared to determine error terms 440, which are then analyzed by loop selection logic 445 executed by the controller to allow closing loop on the appropriate boundaries by adjusting one or more turbine control effectors 450. This process is repeated continuously, for example, as often as 25 times per second, during the operation of the turbine so as to reduce or minimize deviation from the operational boundary models 420, allowing the turbine to run at desired levels, such as at or near a predetermined efficiency level or at or near optimum efficiency.

Accordingly, the ability to optimize turbine operation across multiple operational boundaries at once, rather than a single boundary such as exhaust temperature as occurs when using only schedule-based control systems, allows for more flexible control and improved operating efficiencies. For example, a gas turbine controlled by a model-based control system like that disclosed above will allow the control system to adapt the parameter models and boundary models in real-time or near-real-time in light of any component deterioration or failure, allowing the turbine to continue to operate and correct effector adjustments to accommodate for the degradation. Additionally, a model-based control system is flexible, allowing for relatively simple, real-time updates or modification of operating parameters and boundary models without substantially affecting existing control settings or boundary parameters.

References are made herein to block diagrams of systems, methods, apparatuses, and computer program products according to example embodiments of the invention. It will be understood that at least some of the blocks of the block diagrams, and combinations of blocks in the block diagrams, respectively, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational elements to be performed on the computer or other programmable apparatus to produce a computer implemented process such that the instructions that execute on the computer or other programmable apparatus provide elements for implementing the functions specified in the block or blocks.

One or more components of the systems and one or more elements of the methods described herein may be implemented through an application program running on an operating system of a computer. They also may be practiced with other computer system configurations, including hand-held devices, multiprocessor systems, microprocessor based, or programmable consumer electronics, mini-computers, mainframe computers, etc.

Application programs that are components of the systems and methods described herein may include routines, programs, components, data structures, etc. that implement certain abstract data types and perform certain tasks or actions. In a distributed computing environment, the application program (in whole or in part) may be located in local memory, or in other storage. In addition, or in the alternative, the application program (in whole or in part) may be located in remote memory or in storage to allow for circumstances where tasks are performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated the invention may be embodied in many forms and should not be limited to the example embodiments described above. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for controlling a turbine, comprising:
   receiving at least one turbine operating parameter;
   applying the at least one turbine operating parameter to at least one operational boundary model to determine at least one estimated boundary level, the at least one estimated boundary level being associated with one or more operational boundaries;
   applying the at least one turbine operating parameter to at least one scheduling logic algorithm to determine at least one boundary target;
   comparing the at least one estimated boundary level with the at least one boundary target to determine at least one error term;
   determining at least one relationship between the one or more operational boundaries and at least one turbine control effector;
   determining, from the one or more operational boundaries, at least one operational boundary which imposes an operating limitation that is bigger than operating limitations associated with the rest of the one or more operational boundaries; and
   based on the determining, adjusting the at least one turbine control effector in relation to the at least one operational boundary to reduce the at least one error term, wherein the at least one operational boundary imposes the operating limitation that is bigger than the operating limitations associated with the rest of the one or more operational boundaries.

2. The method of claim 1, further comprising defining the at least one operational boundary model prior to applying the at least one operating parameter to the at least one operational boundary model.

3. The method of claim 1, further comprising defining the at least one scheduling algorithm prior to applying the at least one operating parameter to the at least one scheduling algorithm.

4. The method of claim 1, wherein receiving the at least one turbine operating parameter comprises receiving at least one of a measured operating parameter or a modeled operating parameter.

5. The method of claim 4, wherein the at least one measured operating parameter comprises at least one of an ambient condition, a rotational speed, an inlet temperature, an exit temperature, an inlet pressure, an exit pressure, a fuel flow, an exhaust temperature, or a power output of the turbine during operation.

6. The method of claim 4, wherein the at least one modeled operating parameter comprises at least one of an airflow, a fuel-to-air ratio, a firing temperature, a flame temperature, a fuel system pressure ratio, or acoustic characteristics of the turbine during operation.

7. The method of claim 4, wherein the at least one modeled operating parameter is modeled using an adaptive Kalman filter, a physics-based aero-dynamic model, a regression-fit model, or a neural-net model.

8. The method of claim 1, wherein the at least one operational boundary model comprises a physics-based boundary model or a mathematical transfer function model.

9. The method of claim 1, wherein the at least one operational boundary model models at least one of a gas path durability, an exhaust frame durability, a nitrogen oxide emission, a carbon monoxide emission, a combustor lean blow-out value, combustion dynamics, a compressor surge, a compressor icing, a compressor aero-mechanical limit, a compressor clearance, or a discharge temperature.

10. The method of claim 1, wherein applying the at least one turbine operating parameter to the at least one operational boundary model, applying the at least one turbine operating parameter to the at least one scheduling logic algorithm, and comparing the at least one estimated boundary level with the at least one boundary target are performed during the operation of the turbine.

11. The method of claim 1, wherein adjusting the at least one turbine control effector comprises adjusting at least one of fuel flow, an inlet guide vane setting, an inlet bleed heat setting, or a fuel split setting of the turbine during operation.

12. A turbine control system, comprising:
   at least one turbine control effector;
   at least one turbine operating sensor;
   a controller; and
   a communications interface;
   wherein the controller is in communication with the at least one turbine control effector and the at least one operating turbine sensor via the communications interface; and
   wherein the controller is operable to:
      receive at least one of a measured turbine operating parameter measured by the at least one turbine sensor or a modeled operating parameter modeled by the controller;
      store at least one operational boundary model;
      store at least one scheduling logic algorithm;
      apply the at least one turbine operating parameter to the at least one operational boundary model to determine at least one estimated boundary level, the at least one estimated boundary level being associated with one or more operational boundaries;

apply the at least one turbine operating parameter to the at least one scheduling logic algorithm to determine at least one boundary target;

compare the at least one estimated boundary level with the at least one boundary target to determine at least one error term;

determine at least one relationship between the one or more operational boundaries and at least one turbine control effector;

determine, from the one or more operational boundaries, at least one operational boundary which imposes an operating limitation that is bigger than operating limitations associated with the rest of the one or more operational boundaries; and based on the determination, adjust the at least one turbine control effector in relation to the at least one operational boundary to reduce the at least one error term, wherein the at least one operational boundary imposes the operating limitation that is bigger than the operating limitations associated with the rest of the one or more operational boundaries.

13. The system of claim 12, wherein the at least one measured operating parameter comprises at least one of an ambient condition, a rotational speed, an inlet temperature, an exit temperature, an inlet pressure, an exit pressure, a fuel flow, an exhaust temperature, or a power output of the turbine during operation.

14. The system of claim 12, wherein the at least one modeled operating parameter comprises at least one of an airflow, a fuel-to-air ratio, a firing temperature, a flame temperature, a fuel system pressure ratio, or acoustic characteristics of the turbine during operation.

15. The system of claim 12, wherein the at least one modeled operating parameter comprises an adaptive Kalman filter, a physics-based aero-dynamic model, a regression-fit model, or a neural-net model.

16. The system of claim 12, wherein the at least one operational boundary model comprises a physics-based boundary model or a mathematical transfer function model.

17. The system of claim 12, wherein the at least one operational boundary model models at least one of a gas path durability, an exhaust frame durability, a nitrogen oxide emission, a carbon monoxide emission, a combustor lean blow-out value, combustion dynamics, a compressor surge, a compressor icing, a compressor aero-mechanical limit, a compressor clearance, or a discharge temperature.

18. The system of claim 12, wherein applying the at least one turbine operating parameter to the at least one operational boundary model, applying the at least one turbine operating parameter to the at least one scheduling logic algorithm, and comparing the at least one estimated boundary level with the at least one boundary target are performed during the operation of the turbine.

19. The system of claim 12, wherein the controller is operable to adjust the at least one turbine control effector to adjust at least one of fuel flow, an inlet guide vane setting, an inlet bleed heat setting, or a fuel split setting of the turbine during operation.

20. A method for tuning a turbine, comprising:

receiving at least one of a measured operating parameter or a modeled operating parameter of a turbine during operation; and tuning the turbine during operation by:

applying the at least one measured operating parameter or modeled operating parameter to at least one operational boundary model to determine at least one estimated boundary level, the at least one estimated boundary level being associated with one or more operational boundaries;

applying the at least one measured operating parameter or modeled operating parameter to at least one scheduling algorithm;

comparing the output of the at least one operational boundary model to the output of the at least one scheduling algorithm to determine at least one error term; and closing loop on the at least one error term by determining at least one relationship between the one or more operational boundaries and at least one turbine control effector;

determining, from the one or more operational boundaries, at least one operational boundary which imposes an operating limitation that is bigger than operating limitations associated with the rest of the one or more operational boundaries; and based on the determining, adjusting the at least one turbine control effector during operation of the turbine in relation to the at least one operational boundary to reduce the at least one error term, wherein the at least one operational boundary imposes the operating limitation that is bigger than the operating limitations associated with the rest of the one or more operational boundaries.

* * * * *